N. K. GARHART.
AMALGAM MIXER.
APPLICATION FILED APR. 6, 1915.

1,159,206.

Patented Nov. 2, 1915.

WITNESSES
Edw. Thorpe
Geo. L. Beeler

INVENTOR
N. K. Garhart
BY Munn & Co.
ATTORNEYS

UNITED STATES PATENT OFFICE.

NATHAN K. GARHART, OF WATERTOWN, MASSACHUSETTS.

AMALGAM-MIXER.

1,159,206.  Specification of Letters Patent.  Patented Nov. 2, 1915.

Application filed April 6, 1915. Serial No. 19,524.

*To all whom it may concern:*

Be it known that I, NATHAN K. GARHART, a citizen of the United States, and a resident of Watertown, in the county of Middlesex and State of Massachusetts, have invented a new and Improved Amalgam-Mixer, of which the following is a full, clear, and exact description.

This invention relates to amalgam mixers and has particular reference to mixers of the type indicated for use especially by dentists in preparing fillings for teeth or analogous purposes.

Among the objects of the invention is to provide a device of a simple and reliable nature adapted to perform its service in a minimum period of time.

More definitely stated, the invention includes a cup or mortar in which the alloy and mercury are placed to be mixed, and then a plurality of grinding balls are introduced into the mortar which in turn are operated upon by a vulcanized rubber pestle or a metal mandrel having a top of rubber or its equivalent acting frictionally upon the balls, causing them to revolve around the vertical axis of the mortar and simultaneously rotate around their own axes with direct frictional engagement with one another.

The invention is illustrated in the accompanying drawings in which—

Figure 1:
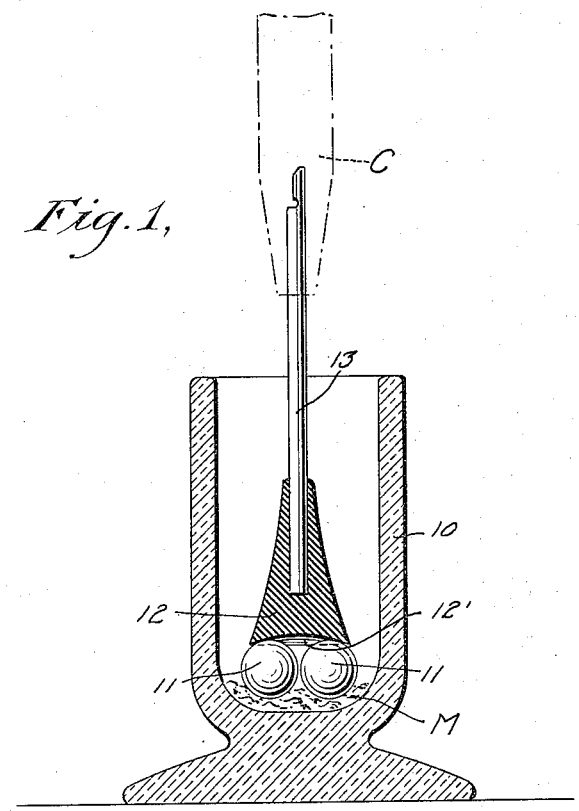
Figure 2:
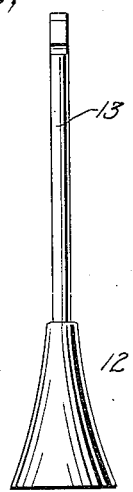
Figure 3:
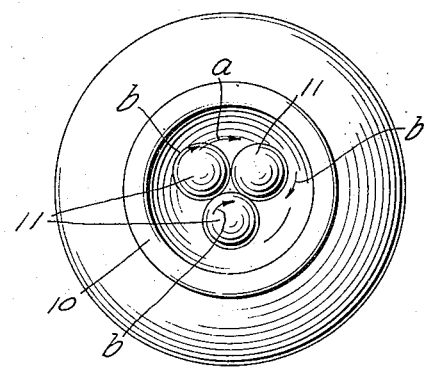

Figure 1 is a vertical sectional view of the complete improvement; Fig. 2 is a side elevation of the pestle and mandrel; and Fig. 3 is a plan view of the device without the pestle.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show at 10 a cup or mortar made of opal or its equivalent, and adapted to receive the mass M of materials to be ground or mixed. A plurality of hard grinding balls 11 shown as three in number are then dropped into the mortar and a vulcanized rubber tip 12 carried by a metal mandrel 13 is then introduced into frictional contact with the upper faces of all of the balls. The mandrel is adapted to be connected to the chuck C at the end of an ordinary flexible shaft of a dental engine (not shown), and through which the tip 12 is given a suitable rotary speed for the purpose of the invention. The rotation of the tip 12 bearing upon all of the balls causes them to revolve in a certain direction as indicated by the arrow A on Fig. 3, and during such revolution each of the balls is caused to rotate around its vertical axis as indicated by the arrows B, whereby the balls are caused to engage with one another frictionally because their contact portions are moving in opposite directions. It will be seen, therefore, that the action of the mixing device is very rapid and most effective, due to the combined rotation and revolution of the grinding balls. Said tip 12 is shown provided with a cavity 12' in its end which engages the grinding balls whereby a better contact is made for the purpose of operating said balls.

I claim:

In a device of the character set forth, the combination of a mortar, a plurality of hard grinding balls of the same size therein and in direct contact with one another, and a shaft extending into the mortar coaxially therewith and having a concave lower end to overlap said balls and cause them to contact with each other and to both revolve around said axis and each to rotate around its own vertical axis, substantially as and for the purposes set forth.

In testimony whereof I have signed my name to this specification in the presence of two subscribing witnesses.

NATHAN K. GARHART.

Witnesses:
 HARRY W. McKAY,
 A. A. STIEN.

Copies of this patent may be obtained for five cents each, by addressing the "Commissioner of Patents, Washington, D. C."